United States Patent [19]

Katsumata et al.

[11] Patent Number: 4,876,616
[45] Date of Patent: Oct. 24, 1989

[54] APPARATUS FOR REPRODUCING A DIGITAL SIGNAL

[75] Inventors: Azusa Katsumata; Shigeyuki Satomura, both of Tokyo, Japan

[73] Assignee: Sony Corporation, Tokyo, Japan

[21] Appl. No.: 220,028

[22] Filed: Jul. 15, 1988

[30] Foreign Application Priority Data

Jul. 22, 1987 [JP] Japan ................................. 62-183022
Jul. 22, 1987 [JP] Japan ................................. 62-183023

[51] Int. Cl.$^4$ .............................................. G11B 5/09
[52] U.S. Cl. ...................................................... 360/53
[58] Field of Search ....................... 360/32, 53; 371/36, 371/49

[56] References Cited

U.S. PATENT DOCUMENTS 4,680,763 7/1987 Suma et al. ........................... 360/53

Primary Examiner—Vincent P. Canney
Attorney, Agent, or Firm—Philip M. Shaw, Jr.

[57] ABSTRACT

An apparatus for reproducing a recorded digital signal suitable for use in a data recorder or the like, wherein error detecting signals (CRC) are generated for respective reproduced header portions of a main data area and a sub-data area formed in each track, the error detecting signals (CRC) are counted for a predetermined period, and the counted value is compared with a predetermined value. A data error condition is determined in accordance with the comparison result, so that it is possible to simplify the circuit arrangment and detect an error condition in the recorded digital data.

14 Claims, 7 Drawing Sheets

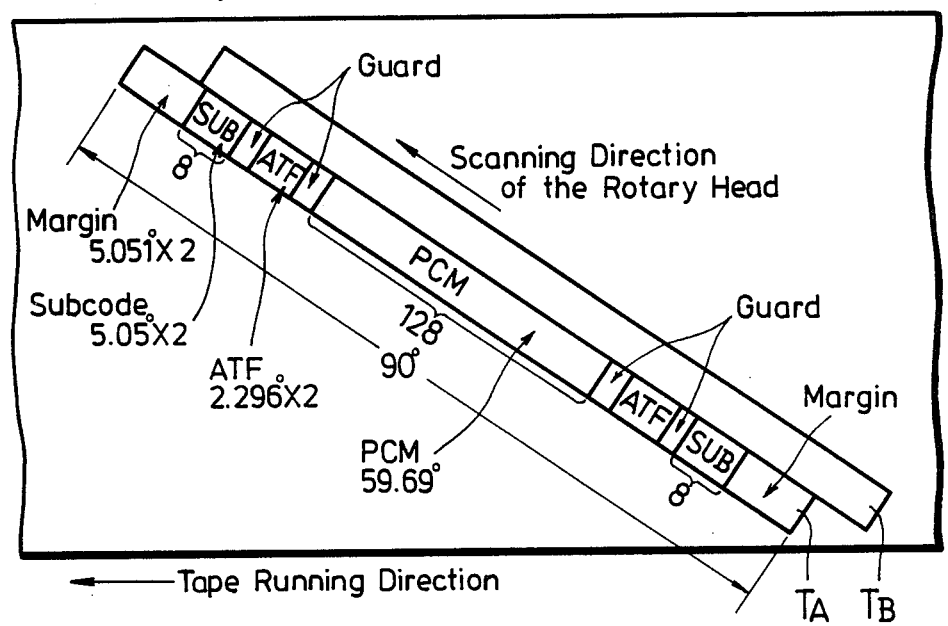
FIG. 1
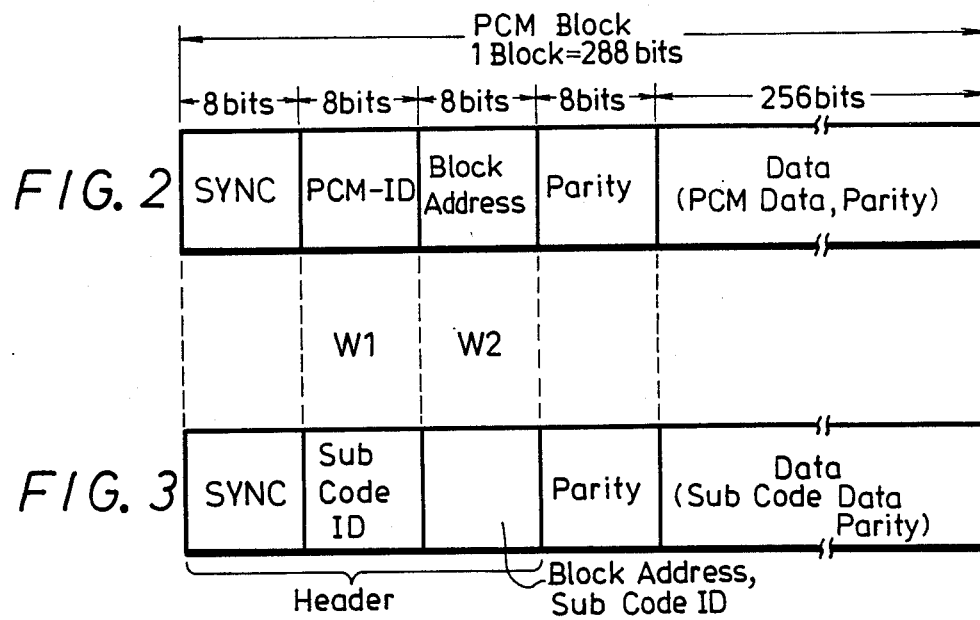
FIG. 2
FIG. 3

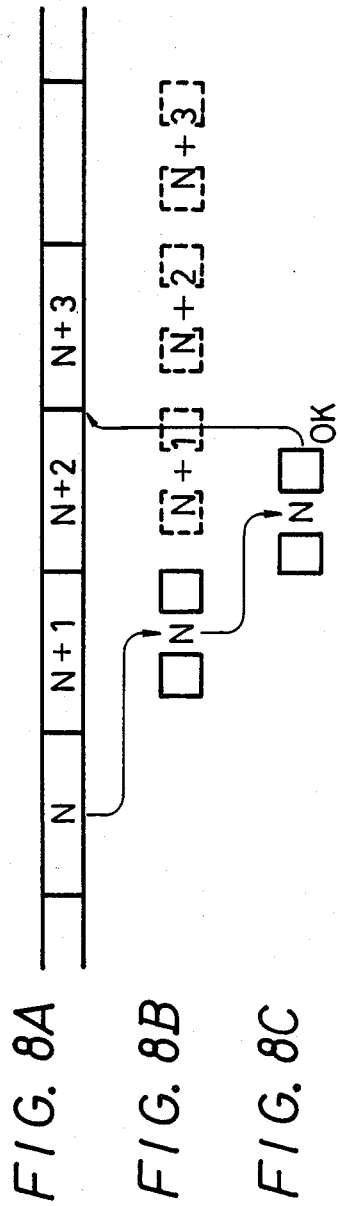
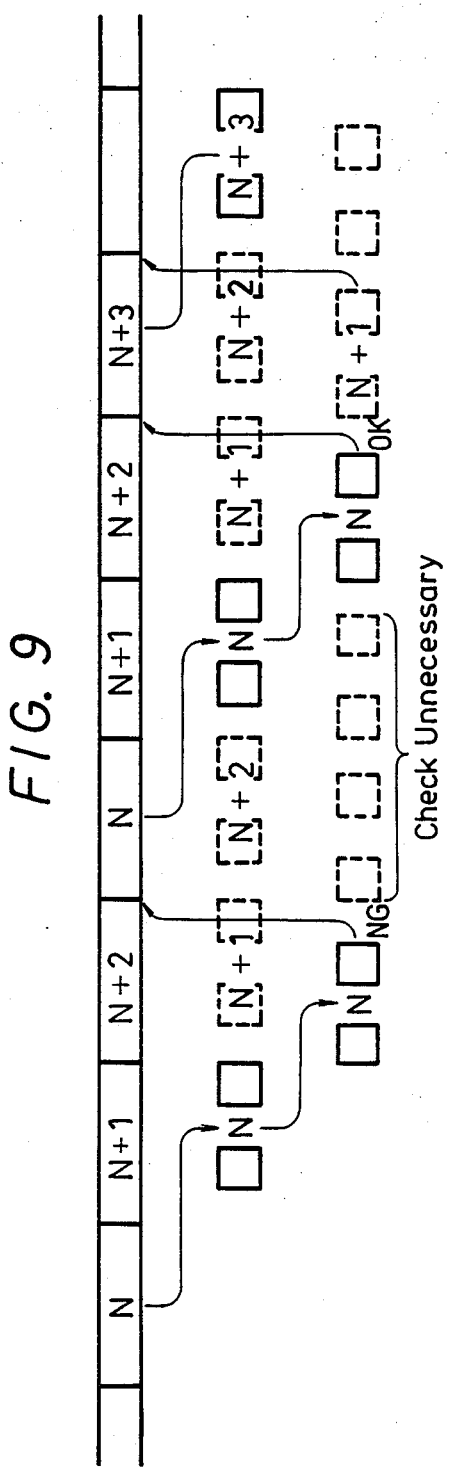
FIG. 8A
FIG. 8B
FIG. 8C
FIG. 9

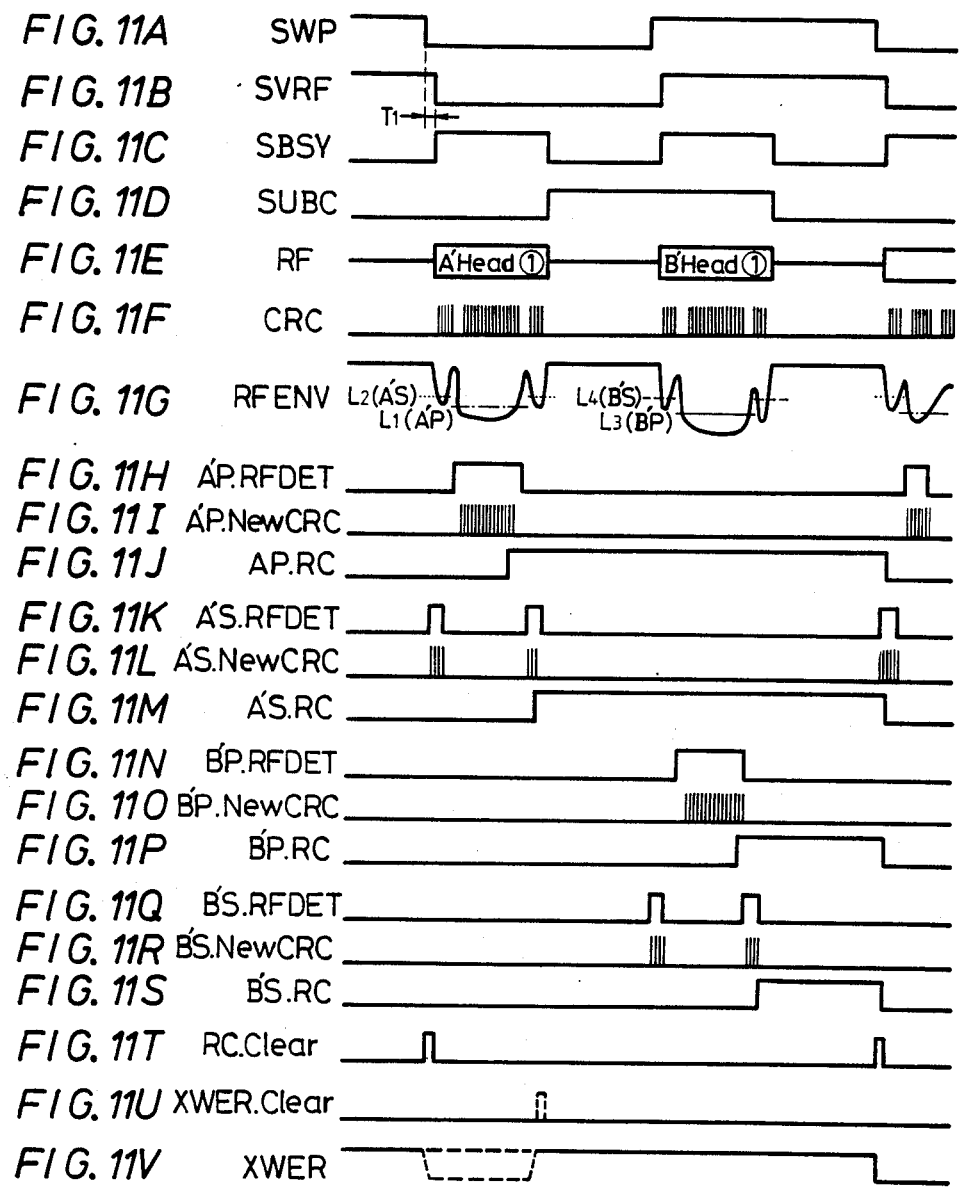

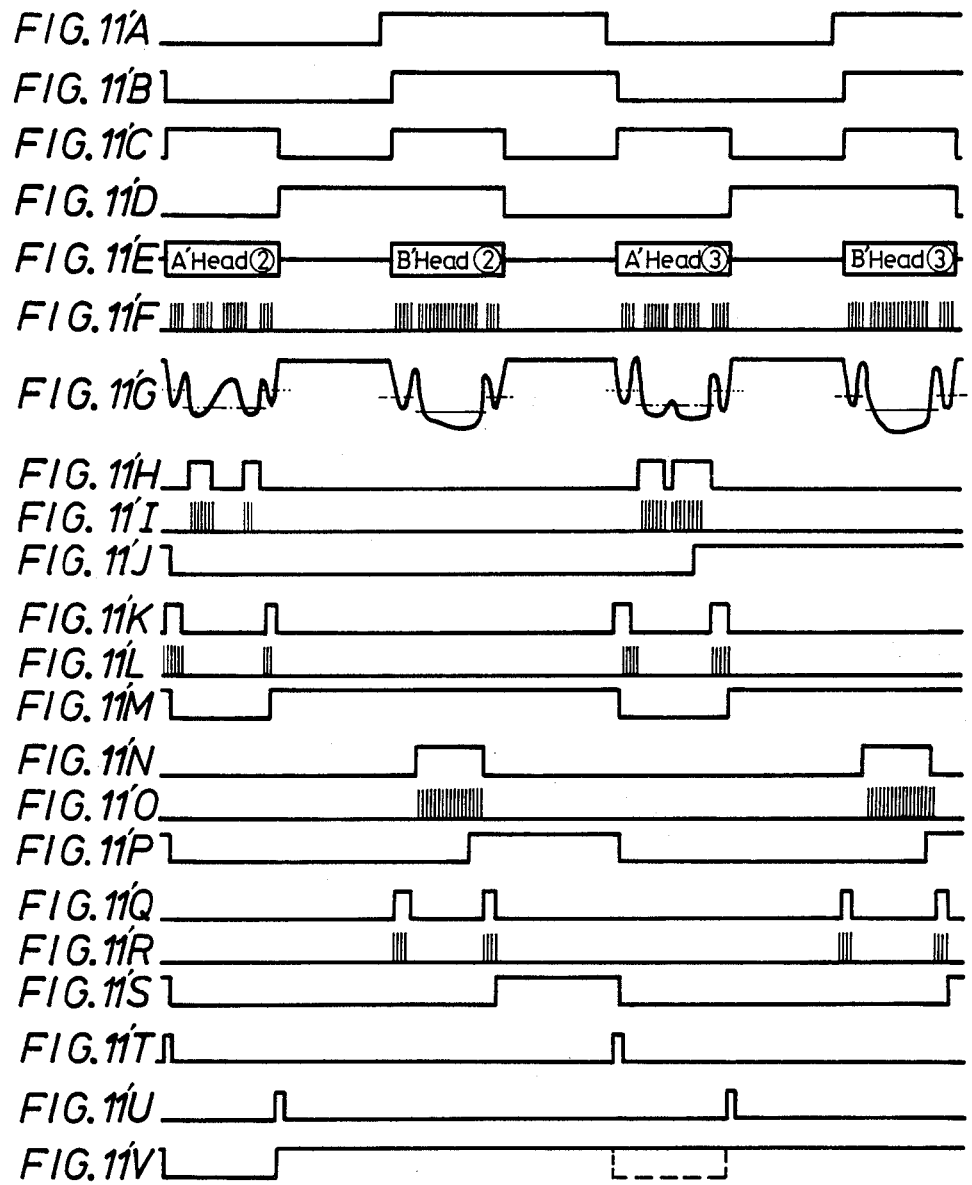

APPARATUS FOR REPRODUCING A DIGITAL SIGNAL

BACKGROUND OF THE INVENTION

1. Field of the Invention

The present invention relates generally to an apparatus for reproducing digital data, and more particularly to the use of a digital audio tape recorder (DAT) for recording data for a computer.

2. Description of the Prior Art

Data processed e.g. by a computer and stored in a hard disk drive or the like is transferred to a recorder or a so-called data streamer to be recorded or backed up on another recording medium, e.g. once a day, for protection of such data. For this purpose, analog audio recorders have been conventionally employed as the data streamer in many cases.

However, the DAT, which has recently been sold in the audio recording market, is suitable for recording the above-mentioned data since it is fundamentally designed to record and reproduce digital signals. In order to use a DAT as a data recorder, a so-called read after write method is employed in consideration of its fidelity, wherein data is written, concurrently read out, and checked for errors. The assignee of the present application has proposed a data recorder using an R-DAT for recording computer data in U.S. patent applications Nos. 133,010, filed Dec. 15, 1987, and 177,624 filed Apr. 5, 1988.

An ordinary DAT of the type which does not employ the read after write method is only provided with a single signal processing circuit which is used in both the data read-out and write modes for detecting errors.

However, if a DAT is employed as a data recorder, the read after write method should be employed for improving the fidelity as described above, so that separate signal processing circuits are used for the data read-out mode and the data write mode, respectively, thereby increasing the size of the circuit and consequently increasing the production cost thereof.

OBJECTS AND SUMMARY OF THE INVENTION

It is an object of the present invention to provide an improved apparatus for reproducing a digital signal.

It is another object of the present invention to provide an apparatus for reproducing a recorded digital signal which includes an error detecting code signal in a header portion as an element for generating a write error decision signal. The generation of the write error decision signal is based on an empirical determination that a predetermined number of error detecting code (CRC) signals found in the reproduced signal indicate that the reproduced signal does not contain any uncorrectable recorded signals, thereby simplifying the circuit arrangement and reducing the production cost thereof.

To achieve the above objects, the present invention provides an apparatus for reproducing a digital signal from a recording medium which has tracks patterned thereon in each of which are recorded a plurality of blocks of data signals, each block of data including a header, a parity of the header and other digital information, the apparatus comprising:

means for reproducing the recorded signals from the recording medium;

error detecting means, which monitors the reproduced header parity, for detecting good parity for each block and outputting a corresponding good parity detection signal;

counting means for counting the good parity detection signal from the error detecting means; and comparing means for comparing the error count in the counting means with a predetermined value and outputting a write error decision signal, indicating the corresponding data block has no uncorrectable errors, when the count eceeds the predetermined value, and indicating that the corresponding data block has uncorrectable errors, when the count does not exceed the predetermined value.

The invention fundamentally includes the method employed by the above described apparatus, namely a method of reproducing a digital signal from a recording medium which has tracks patterned thereon in each of which are recorded a plurality of blocks of data signals, each block of data including a header, a parity of the header and other digital information, the method comprising the steps of:

reproducing the recorded signals from the recording medium;

monitoring the reproduced header parity and detecting good parity for each block and outputting a corresponding good parity detection signal;

counting the good parity detection signals; and comparing the error count with a predetermined value and outputting a write error decision signal, indicating the corresponding data block has no uncorrectable errors, when the count exceeds the predetermined value, and indicating that the corresponding data block has uncorrectable errors, when the count does not exceed the predetermined value.

These and other objects, feature and advantages of the present invention will become apparent from the following detailed description of the preferred embodiment taken in conjunction with the accompanying drawings, throughout which like reference numerals designate like elements and parts.

BRIEF DESCRIPTION OF THE DRAWINGS

FIG. 1 is a diagram showing a tape format of the digital audio tape recorder (DAT);

FIG. 2 is a diagram showing a PCM block format of the DAT;

FIG. 3 is a diagram showing a sub-code format of the DAT;

FIGS. 8A to 8C are explanatory diagrams showing a recording procedure carried out by the apparatus of the present embodiment;

FIG. 9 is an explanatory diagram showing a recording procedure of the present embodiment when an error is detected;

FIGS. 11A to 11V (formed of two separate parts 11 and 11') are timing charts of signals generated in the error decision signal generating circuit of FIG. 10.

DESCRIPTION OF THE PREFERRED EMBODIMENT

Figure 4:
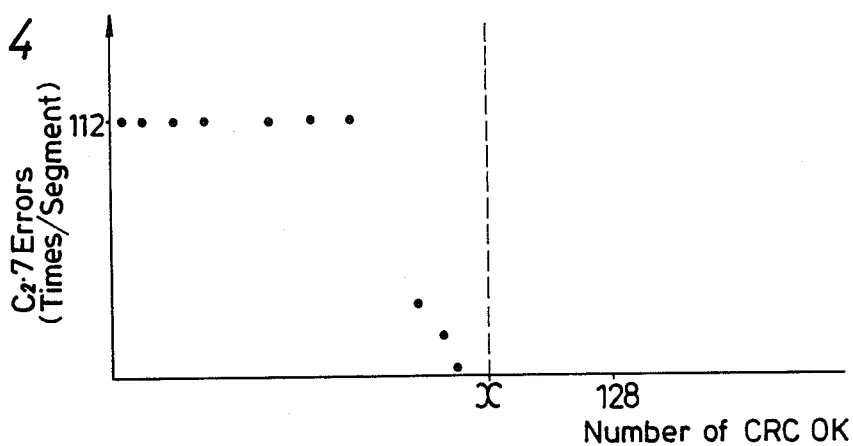
FIG. 4 is a graph showing a correlation between an error correcting code $C_2$ and an error detecting code (CRC) of the DAT.

A description will first be given of a digital audio tape recorder (DAT) with reference to FIGS. 1 to 4.

A so-called BCH code is a type of code having the highest ability to correct errors and is most widely defined of all the typical random error correcting codes ever known. A so-called Reed-Solomon code is a particular application of the BCH code. The DAT employs a double Reed-Solomon code which uses as the Reed-Solomon code a code $C_1$ for correcting errors and a code $C_2$ for again correcting errors.

In a rotary head type DAT, if a tape is scanned by heads A and B, signals are recorded on the tape in accordance with a tape format as shown in FIG. 1, wherein a track $T_A$ is formed by the head A and a track $T_B$ by the head B.

As can be seen from FIG. 1, one frame is made up of two tracks Ta and Tb formed by the heads A and B. Each of the tracks Ta and Tb has a length corresponding to the rotation of each of the respective heads through an angle of 90° and is partitioned from its lower end (i.e. from right to left in the figure) into 5.051° of a margin area, 0.918° of a preamble area for the PLL of the sub-code, 3.673° of a first sub-code, 0.459° of a postamble area, 1.378° of an interblock gap or guard area, 2.296° of a tracking (ATF) signal area, 1.378° of an interblock gap or guard area, 0.918° of a preamble area for the PLL of data, 58.776° of data area, 1.378° of an interblock gap or guard area, 2.296° of an AFT signal area, 1.378° of an interblock gap or guard area, 0.918° of a preamble area for the PLL of the sub-code, 3.673° of a second sub-code area, 0.459° of the postamble area, and 5.051° of the margin area. It should be noted that the scale of the respective areas in FIG. 1 is not exact. In the above-mentioned arrangement, eight blocks of sub-codes including the same contents are written into each of the two sub-code areas SUBs of the same track.

FIG. 2 shows a data arrangement of one block of the PCM data. A block synchronizing signal of eight bits (one symbol) is added to the head of one block, and a PCM-ID of eight bits is added thereafter. Following the PCM-ID, a block address of eight bits is added. These two symbols of the PCM-ID and the block address (also referred to as "W1" and "W2", respectively) are subjected to an error correcting encoding process of a simple bit and the resulting eight-bit parity is added after the block address. The remaining 256-bit (comprising 32 symbols since one symbol is formed of eight bits) area is assigned to record PCM data and an error correcting parity generated therefor.

FIG. 3 shows a sub-code block format, wherein its one block is formed of 288 bits, similar to the PCM data block.

As is clearly illustrated in FIG. 3, the first eight bits of the one block is assigned to a block synchronizing signal area, the next eight-bit data $W_1$ a sub-code ID area, the next eight-bit data $W_2$ an area for recording a sub-code ID and a signal indicative of its address, the next eight bits an area for recording a parity P generated for the data $W_1$ and $W_2$, and the remaining 256 bits (comprising 32 symbols since one symbol is made of eight bits) an area for recording sub-code data and an error correcting parity generated for the sub-code data.

In FIGS. 2 and 3, the portion for recording the synchronizing signal and the data $W_1$ and $W_2$ are generally referred to as the "header".

When the aforementioned double Reed-Solomon codes $C_1$ and $C_2$ are applied to the DAT, errors are detected and corrected, if any error is detected, by the use of the parity in the PCM data area. The code $C_2$ is valid for data which includes zero to six errors (referred to as a "correctable error"), however, it is invalid for data which includes seven or more errors (referred to as an "uncorrectable error").

The signal processing circuit of the DAT examines the parity in the header portion of every block and generates an error detecting (monitor) signal (CRC) if the parity in the header portion shows that there are no uncorrectable errors in the associated block (so that the parity is expressed as "good").

The result of experiments shows that there is a correlation between the number of occurrences of uncorrectable errors (hereinafter referred to as $C_2.7$ error) and the number of blocks including the good parity (hereinafter referred to as the "number of CRC-OK") in one segment, as illustrated in FIG. 4.

FIG. 4 shows that if the number of the error detecting signals (CRC-OK) is x or more in one segment, there are no uncorrectable errors. In other words, if x or more error detecting signals (CRC-OK) are generated in one segment, it can be determined that data written into the segment is error free. Thus, the present invention is intended to produce a write error decision signal from the CRC signal indicative of a good parity in the header portion by the use of the value x as the basis of the error determination. The value x should meet the following setting requirements:

(1) The number of the error detecting signals (CRC) must be less than x when errors cannot be corrected; and
(2) The case to be avoided to the utmost is where the number of the generated error detecting signals (CRC) is less than x but no error exists.

Now, an embodiment of an apparatus for reproducing digital signals according to the present invention will hereinafter be described with reference to FIG. 5.

Figure 5:
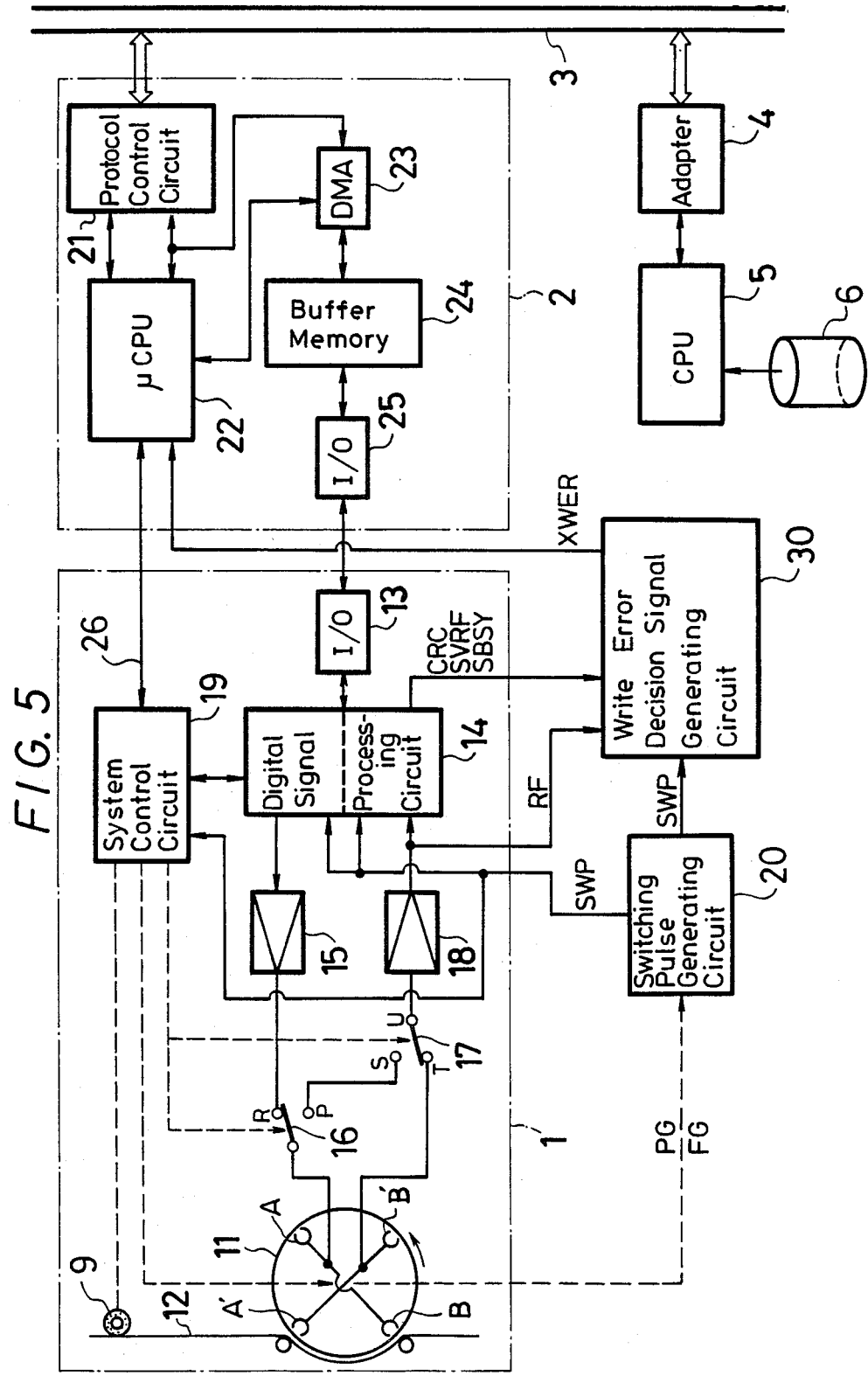
FIG. 5 is a circuit block diagram showing the whole arrangement of an embodiment of the present invention.

FIG. 5 shows the whole arrangement of the apparatus which employs the DAT as a data recorder. In FIG. 5, the DAT 1 is provided with a rotary head drum 11, and a magnetic tape 12 is wrapped around the peripheral surface of the rotary head drum 11 over an angular range of about 90° of head travel and is transported over the head drum 11 by a tape transport 9. Two recording-/reproducing rotary heads A and B are mounted on the rotary head drum 11 with an angular spacing of 180°, and two oblique tracks are recorded and/or reproduced by the heads A and B per one revolution of the rotary head drum 11.

Incoming digital data is supplied to an I/O (input and output) circuit 13 of the DAT 1. The digital data from the I/O circuit 13 is supplied to a digital signal processing circuit 14 wherein it is converted into the DAT format as mentioned before. The digital data converted in accordance with the DAT format is supplied through a recording amplifier 15 and a recording side contact R of a recording/reproducing change-over switch 16 to the rotary heads A and B, and is thereby recorded on the tape 12.

When the signal recorded on the tape 12 is reproduced by the rotary heads A and B, the switch 15 is changed over under the control of a system controller 19 and the reproduced signal is supplied through a reproducing side contact P of the recording/reproducing change-over switch 16 to a fixed contact S of a change-over switch 17.

Figure 6:
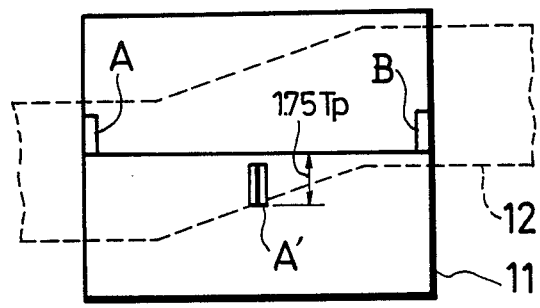
FIG. 6 is a diagram schematically showing a construction of a rotary head drum employed in the embodiment of FIG. 5.

The rotary head drum 11 is also provided with rotary heads A' and B' for checking reproduction at locations spaced by an angular distance of 270° backward with respect to the head rotating direction indicated by an arrow in the drawing from the rotary heads A and B, respectively. In addition, the rotary heads A' and B' are stepped or displaced by, for example, 1.75 track pitches (Tp) with respect to the rotary heads A and B as shown in FIG. 6.

Figure 7:
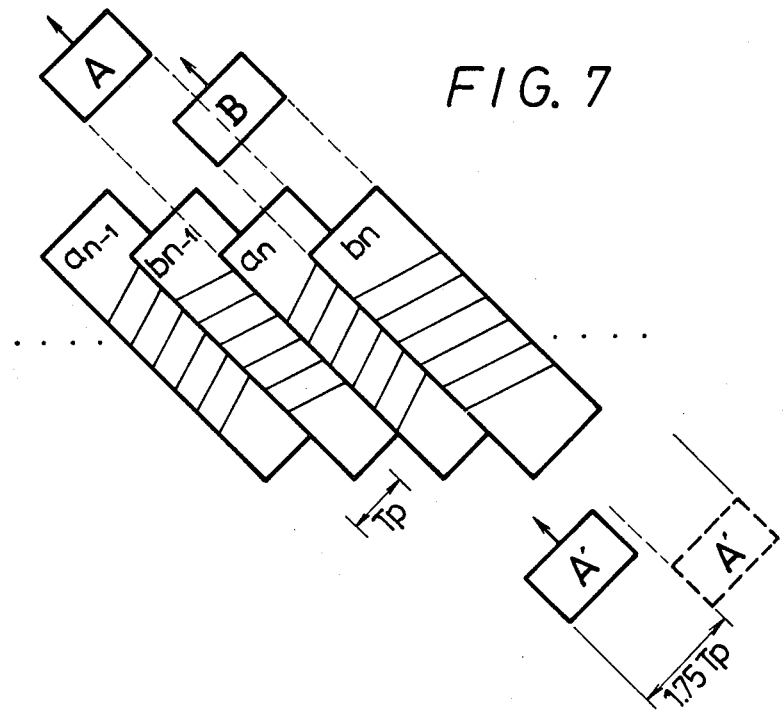
FIG. 7 is a diagram schematically showing a track pattern made by the DAT.

The rotary head B is mounted with the angular spacing of 180° backward from the rotary head A with respect to the rotating direction of the rotary head drum 11 without displacement. If the recording/reproducing heads A and B have a width 1.5 times wider than the track pitch $T_p$ and are positioned as shown in FIG. 7, a track recorded by, for example, the rotary head A has a 0.5 track pitch portion which is erased by recording the next track by the rotary head B so that a so-called guard-bandless recording is carried out. If, for example, the rotary head A' is provided without the displacement, the relative position of the rotary head A' will be as indicated by a broken line in FIG. 7. On the other hand, by displacing the rotary head A' by 1.75 track pitches, the rotary head A' is positioned so as to trace a track formed by the head A after it has passed the position of the head B. If the azimuth angles of head gaps are made different between the heads A and B, the checking heads A' and B' must have the same azimuth angles as those of the heads A and B, respectively.

Referring again to FIG. 5, signals reproduced by the checking heads A' and B' are supplied to the other fixed contact T of the change-over switch 17. A signal derived at a movable contact U of the change-over switch 17 is supplied through a reproducing amplifier 18 to the digital signal processing circuit 14 in which it is reconverted to digital data and delivered to the outside through the I/O circuit 13.

The signal processing circuit 14 includes a generating circuit for generating the parity in the header portion, i.e. the error detecting signal and the error correcting code, an error detecting circuit for detecting whether the parity in the header portion is good or not, and an error correcting circuit for generating the error detecting signal (CRC). The generation of the error correcting code and error correction effected by the generated error correcting code employ an operating circuit in common. Thus, at the time when the error detecting signal and the error correcting signal generating circuit is used during recording, the error correcting circuit is rendered inoperative. However, the error detecting circuit for the parity in the header portion can be independently operated.

When signals reproduced by the checking heads A' and B' are supplied through the other fixed contact T of the change-over switch 17 to the digital signal processing circuit 14, it is possible to detect the amount of errors occurring in the reproduced signals. The detecting signal therefrom is supplied to the system control circuit 19 by the microcomputer 22, as will be explained in further detail.

The system control circuit 19 is further supplied with a control signal 26 from the outside. A signal from the system control circuit 19 controls the rotation of the rotary head drum 11, transportation of the tape 12 by the tape transport 9, the change-over of the change-over switches 16 and 17 and so on. Also, upon recording, the signal from the system control circuit 19 is supplied to the digital signal processing circuit 14 which accordingly produces predetermined sub-code signals or the like. Upon reproduction, a signal extracted by the digital signal processing circuit 14 is supplied to the system control circuit 19, whereby the tracking control operation or the like is performed and a part of this signal is delivered to the outside.

The DAT 1 is constructed as described above. In this DAT 1, by providing a DA (digital-to-analog) / AD (analog-to-digital) converting circuit at the outside of the I/O circuit 13 and a predetermined control apparatus at the outside of the system control circuit 19, it is possible to record and/or reproduce, for example, an analog audio signal.

In the present invention, however, an interface bus 3 is connected through a controller 2 as an external apparatus to the DAT 1. The interface bus 3 may be of the type which conforms, for example, to the SCSI (small computer system interface) standard (see "NIKKEI ELECTRONICS", pp. 102 to 107, published by Nihon Keizai Shinbunsha on Oct. 6, 1986). A host computer 5, a hard disk drive (HDD) 6 and so on are connected to this interface bus 3 through an adapter 4.

In the above-mentioned controller 2, a protocol control circuit 21 is connected to the interface bus 3. Through the protocol control circuit 21, the data and the control signals are communicated to a microcomputer 22, which controls the operation of the controller 2, a memory control or DMA (Dynamic Memory Access) circuit 23 and the bus 3. The microcomputer 22 not only controls the operation of the DMA circuit 23 but also detects the address of the DMA circuit 23. Also, data is communicated between a buffer memory 24 and the interface bus 3 through the DMA circuit 23. Further, data is communicated between the buffer memory 24 and the digital signal processor 14 provided in the DAT 1 via I/O circuits 25 and 13. In addition, a control signal 26 is communicated between the microcomputer 22 and the system control circuit 19.

Accordingly, data written in the hard disk drive 6 is supplied through the interface bus 3 to the controller 2 in response to a transfer request from the controller 2 during recording and is then written in the buffer memory 24 through the DMA circuit 23. The data written in the buffer memory 24 is read out through the I/O circuit 25 and then fed to the DAT 1. In the DAT 1, the data inputted to the I/O circuit 13 is regarded as being equivalent to that derived from an A/D converting circuit when an audio signal is recorded. Thus, this data is converted in accordance with the predetermined DAT format by the digital signal processing circuit 14 and then recorded on the tape 12 by the rotary heads A and B.

Further, upon recording, signals reproduced by the checking heads A' and B' are supplied through the change-over switch 17 to the digital signal processing circuit 14, whereby the error detecting operation is effected as described above. If errors are detected beyond the error correctable range in an error correcting operation for reproduction, an error detecting signal is supplied from the microcomputer 22 to the system control circuit 19 which controls the DAT 1 to take countermeasures such as re-recording the same data.

Specifically, as shown in FIG. 8A, when data N, N+1, N+2..., each containing one frame portion of data, are supplied from the controller 2 to the DAT 1, each of the data is formatted and recorded by the heads A and B as shown in FIG. 8B. Then, the recorded signal is reproduced by the checking heads A' and B' for the error detection operation as shown in FIG. 8C. In this manner, the result of the error detection is not available until three frames of data have been recorded.

If an error is detected by the digital signal processing circuit 14, a signal from the system control circuit 19 is supplied to the microcomputer 22, whereby the DMA circuit 23 is controlled to read data from the three preceding frames again from the buffer memory 24. Therefore, as shown in FIG. 9, if an error is detected in the data N, the data N is again read out after the data N+1 and N+2 have been read out. Then, the data N in which the error has been detected is re-recorded, and the data N+1, N+2... are also recorded again thereafter. Since the N+1 and N+2 are also recorded repeatedly, it is not necessary to effect the error detection on the data N+1 and N+2 recorded before the re-recorded data N.

In connection with the DAT 1 of the present embodiment, there are provided a switching pulse generating circuit 20 for generating a switching pulse SWP in response to a PG signal and an FG signal which are, respectively, generated by a pulse generator and a frequency generator (not shown). The pulse generator and the frequency generator are attached to the rotary head drum 11. Also provided is a write error decision signal generating circuit 30 for generating a write error decision signal XWER to the microcomputer 22 on the basis of the switching pulse SWP from the switching pulse generating circuit 20, an RF signal from the reproducing amplifier 18, the CRC signal, a servo reference signal SVRF and a sub-sync signal SBSY from the digital signal processing circuit 14. The switching pulse generating circuit 20 and the write error decision signal generating circuit 30 can be built into the DAT 1. The switching pulse SWP from the switching pulse generating circuit 20 is also supplied to the digital signal processing circuit 14 as well as the system control circuit 19.

The write error decision signal generating circuit 30 counts the error detecting signal (CRC) indicative of a good parity in the header portion for a predetermined period. If the counted value is above a predetermined value, the generating circuit 30 generates a write error decision signal XWER at a predetermined level, for example, a low level which indicates that data has been written without errors. However, if the counted value is below the predetermined value, the generating circuit 30 generates the write error decision signal XWER at a predetermined level, for example, a high level which indicates that data has been erroneously written. The write error decision signal XWER is transferred to the microcomputer 22 of the controller 2.

Figure 10:
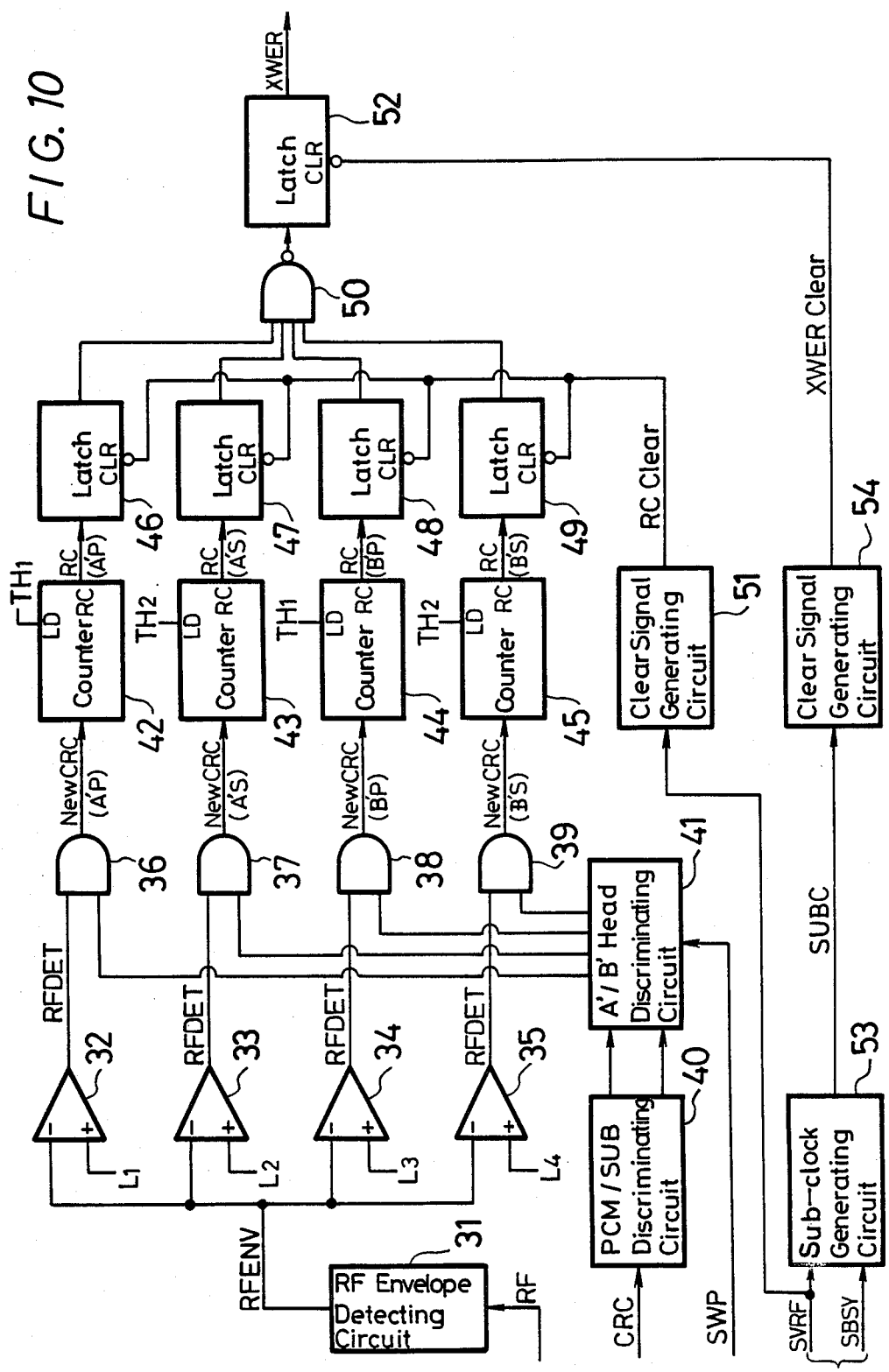
FIG. 10 is a circuit block diagram showing the whole arrangement of an error decision signal generating circuit employed in the embodiment of FIG. 5.

FIG. 10 shows an example of a specific circuit arrangement of the write error decision signal generating circuit 30. The RF signal (FIG. 11E) from the reproducing amplifier 18 is supplied to an RF envelope detecting circuit 31 to detect an RF envelope detecting signal RFENV (FIG. 11G) which in turn is supplied to the inverting input terminals of respective comparators 32-35, inclusive.

The non-inverting input terminals of the respective comparators 32-35 are respectively set to predetermined levels $L_1$-$L_4$ as reference values in accordance with the respective heads and regions. For example, the non-inverting input terminal of the comparator 32 is set to the level $L_1$ with respect to the area of PCM signals reproduced by the checking head A'. The non-inverting input terminal of the comparator 33 is set to the level $L_2$ with respect to the area of sub-codes reproduced by the checking head A'. The non-inverting input terminal of the comparator 34 is set to the level $L_3$ with respect to the area of PCM signals reproduced by the checking head B'. The non-inverting input terminal of the comparator 35 is set to the level $L_4$ with respect to the area of sub-codes reproduced by the checking head B'.

The RF envelope signal is different in level among the respective areas. The respective levels $L_1$-$L_4$ are set to values which clearly distinguish a portion where the RF signal exists from a portion where the RF signal drops in each area of the RF signal with respect to the RF envelope signal. For example, the levels $L_2$ and $L_4$ of the checking heads A' and B' relative to the sub-code area are set to a mean value of the level of the whole RF signal. The levels $L_1$ and $L_3$ of the checking heads A' and B' relative to the PCM signal area are set to a predetermined value, for example 0.7V, below the levels $L_2$ and $L_4$.

The comparators 32-35 respectively generate signals RFDETs (FIGS. 11H, 11K, 11N and 11Q) which are at a high level (H) when the inputted RF envelope signals are respectively below the levels $L_1$-$L_4$, while at a low level (L) when the RF envelope signals are above the levels $L_1$-$L_4$. These signals RFDETs are supplied to one of the input terminals of each AND circuit 36 to 39, inclusive.

The digital signal processing circuit 14 (FIG. 5) generates the error detecting signal (CRC), which is indicative of a good parity in the header portion as described above, which is supplied to a PCM/SUB discriminating circuit 40. In the PCM/SUB discriminating circuit 40 it is determined whether the CRC signal is a CRC signal generated with respect to the parity in the header portion of the PCM area or a CRC signal generated with respect to the parity in the header portion of the sub-code area. The CRC signal thus discriminated is supplied to an A'/B' head discriminating circuit 41 which further determines whether the CRC signal was reproduced by the checking head A' or B', i.e. whether it was reproduced from the track $T_A$ or $T_B$, on the basis of the switching pulse SWP from the switching pulse generating circuit 20 (FIG. 5). The A'/B' discriminating circuit supplies the appropriate discriminated CRC signal to each of the other inputs of the AND gates 36-39, inclusive.

Thus, the AND circuit 36 is supplied at its other input terminal with the CRC signal generated with respect to the parity in the header portion of the PCM area recorded on the track $T_A$, while the AND circuit 37 is supplied at its other input terminal thereof with the CRC signal generated with respect to the parity in the header portion of the sub-code area recorded on the track $T_A$. The AND circuit 38 is supplied at its other input terminal thereof with the CRC signal generated with respect to the parity in the header portion of the PCM area recorded on the track $T_B$, while the AND circuit 39 is supplied at its other input terminal thereof with the CRC signal generated with respect to the parity in the header portion of the sub-code area recorded on the track TB.

As described above, by supplying the AND circuits 36 to 39 with the RFDET signals and the CRC signals, the CRC signal is substantially masked by the RFDET signals, to thereby remove the CRC signal generated when the level of the RF signal is lowered. Consequently, the AND circuits 36 to 39 deliver at their outputs new CRC signals ("New CRC"), as shown in FIGS. 11I, 11L, 11O and 11R, indicating the good parity of the header portion during a predetermined period where the RF signal level remains above the predetermined value.

The New CRC signals from the AND circuits 36–39 are respectively supplied to counters 42–45 and sequentially counted. The load terminals LD of the counters 4–45 are set to respective predetermined values such that if the counted values exceed the predetermined values, the counters 42–45 generate ripple carries RCs (FIGS. 11J, 11M, 11P and 11S). The generation of the ripple carry RC means that the data write has been accomplished without error.

The numbers of the CRC signals in the PCM area and the sub-code area included in one segment are different from each other. As will be understood from FIG. 1, the possible total number of the CRC signals from the PCM area is 128, and that from the sub-code area is 16 (8×2). The predetermined values set to the load terminals of the counters 42–45 are determined in consideration of these numbers. For example, a predetermined value $TH_1$ set to the load terminals of the respective counters 42 and 44 is determined to be 106, and a predetermined value $TH_2$ set to the load terminals of the respective counters 43 and 45 is determined to be 9. The predetermined values $TH_1$ and $TH_2$ should be selected larger for preventing failure in detecting an uncorrectable error segment. However, excessively large values $TH_1$ and $TH_2$ cause a lowering in the data transfer rate, so that they should be determined in view of these conditions.

The ripple carries RCs from the counters 42–45 are respectively latched by latch circuits 46–49 and are next supplied to a NAND circuit 50. The latch circuits 46–49 are cleared by a clear signal RC Clear (FIG. 11T) generated from a clear signal generating circuit 51 in synchronism with the falling edge of the servo reference signal SVRF (FIG. 11B) supplied from the digital signal processing circuit 14 (FIG. 5). Incidentally, the servo reference signal SVRF is delayed by a predetermined time $T_1$, e.g. 250–916 $\mu$sec from the switching pulse SWP (FIG. 11A). The signal outputted from the NAND circuit 50 is latched by a latch circuit 52 and thereafter supplied to the microcomputer 22 as the write error decision signal XWER (FIG. 11V). For example, the decision signal XWER at a low level is supplied to the microcomputer 22 when data write has been accomplished without any errors, and the decision signal XWER at a high level is supplied when data write has been erroneous and accordingly the data must be written again.

The servo reference signal SVRF and the sub-sync signal SBSY (FIG. 11C) is supplied from the digital signal processing circuit 14 to a sub-clock generating circuit 53 which generates a sub-clock SUBC (FIG. 11D) on the basis of the supplied signals SVRF and SBSY and supplies the sub-clock SUBC to a clear signal generating circuit 54. The clear signal generating circuit 54 generates a clear signal XWER Clear (FIG. 11U) in synchronism with the rising edge of the sub-clock SUBC and supplies the clear signal XWER Clear to the latch circuit 52 to clear the same.

Next, an explanation will be given of the operation of the write error decision signal generating circuit 30 shown in FIG. 10 with reference to waveform charts shown in FIGS. 11A–11V.

If, while the data is being written by the heads A and B, it is reproduced by the checking heads A' and B', the RF signal as shown in FIG. 11E from the reproducing amplifier 18 is supplied to the RF envelope detecting circuit 31. The RF envelope detecting circuit 31 derives the RF envelope signal RFENV, as shown in FIG. 11G, and outputs it. The RF envelope signal RFENV is supplied to the inverting input terminals of the comparators 32–35 to be compared with the levels $L_1$–$L_4$, respectively supplied to the non-inverting input terminals of the comparators 32–35 (see FIG. 11G). Consequently, the comparators 32–35 produce the signals RFDETs as shown in FIGS. 11H, 11K, 11N and 11Q at their respective outputs.

The signals RFDETs are respectively supplied to one input terminal of each of the AND circuits 36–39, whereby the CRC signal supplied to the other input terminals of the AND circuits 36–39 as shown in FIG. 11F is substantially masked. Therefore, the AND circuits 36–39 respectively derive New CRC signals as shown in FIGS. 11I, 11L, 11O and 11R at the outputs thereof.

These New CRC signals are respectively supplied to [the corresponding counters 42–45 to be sequentially counted. When the counted values of the counters 42–45 exceed the predetermined value $TH_1$ and $TH_2$, the counters 42–45 output the ripple carries RCs as shown in FIGS. 11J, 11M, 11P and 11S, respectively. As will be understood from the central portion of FIG. 11J, since the level of an RF signal reproduced, when the checking head A' scans the PCM area, is low during the second scanning of the heads A' and B', the CRC signals reproduced at this time are removed. Even if the counter 42 counts the consequently generated New CRC signals, the counted value thereof does not reach the predetermined value $TH_1$. Therefore, the counter 42 does not output the ripple carry RC.

When all the counters 42–45 output the ripple carries RCs (in the first and third scannings in FIG. 11), the NAND circuit 50 is supplied with all the ripple carries RCs at a high level through the latch circuits 46–49, so that the NAND circuit 50 is opened and supplies the output signal, which is at low level, to the latch circuit 52. As a result, the latch circuit 52 derives at its output the write error decision signal XWER at the low level as shown in dashed line in a central portion of FIG. 11V, which indicates that the write operation has been accomplished by the heads A and B without any error.

However, if at least one of the counters 42–45 does not output the ripple carry RC (in the second scanning in FIG. 11, the counter 42 does not output the ripple carry RC). The ripple carries RCs supplied to the NAND circuit 50 from the counters 43–45 through the latch circuit 47–49 are therefor at a high level while the ripple carry RC from the counter 42 is at a low level, so that the NAND circuit 50 is not opened. Consequently, the latch circuit 52 latches a high level output signal and produces at its output the write error decision signal XWER at a high level as shown in the latter half of FIG. 11V, which indicates that the write operation by the heads A and B has been erroneous at this time. If the counter 42 also outputted the ripple carry RC at a high level upon the second scanning the write error decision signal XWER would be at the low level as shown by a broken line in FIG. 11V, thereby indicating that the write operation by the heads A and B has been carried out without any errors.

The dashed line portion in the first half of FIG. 11V indicates the write error decision signal XWER in the preceding scanning. The ripple carries RCs latched by the latch circuits 46–49 and the write error decision signal XWER latched by the latch circuit 52 are cleared by the clear signals shown in FIGS. 11T and 11U, respectively.

The write error decision signal XWER thus provided is fetched by the microcomputer 22 of the controller 2 at the time corresponding to the falling edge of the clear signal RC Clear. If the write error decision signal XWER is at a low level, no errors have occurred in writing, and therefore the normal operation proceeds without any change. On the other hand, if the write error decision signal XWER is at a high level, the data has been erroneously written so that the same data is rewritten in the DAT 1 under the control of the controller 2.

In the present embodiment as described above, since an erroneous write operation in the read after write method is substantially determined by the CRC signal indicative of the good parity of the header portion, a conventional digital signal processing circuit can be employed for detecting the write error decision signal.

Thus, in producing the write error decision signal at every frame (two tracks), if the number of the CRC signals does not reach a predetermined value in any one of the four areas in the frame, which have different contents, there exists an error. The write has been erroneously carried out and the controller 2 can detect data errors in the respective four areas without failure.

In determining whether an error is correctable or not by the use of the CRC signal, the CRC signal for the RF signal above a predetermined value is clearly outputted and the CRC signal for the RF signal below a predetermined value is removed thereby rendering it possible to generate the write error decision signal by means of the CRC signal upon read Further, since it is ensured that the CRC signals are output for the respective PCM and sub-code areas reproduced by the checking heads A' or B', the write error decision signal can be more exactly detected by means of the CRC signal.

According to the present invention as described above, the CRC signal generated in connection with the parities in the header portions of the main and auxiliary data areas formed in every track is counted for a predetermined period, the counted value is compared with a predetermined value, and an erroneous condition of digital data is determined in accordance with the comparison result, thereby making it possible to simplify the circuit arrangement and reduce the production cost of the apparatus.

Further, the RF envelope is detected from the RF signal, the detected RF envelope is compared with a reference value, the comparison result and the CRC signal generated with respect to the parities in the header portions of the main and auxiliary data areas formed in every track are logically processed to derive the new CRC signal which in turn is counted for a predetermined period. The counted value of the new CRC signal is compared with a predetermined value, and an erroneous condition of digital data is determined in accordance with the comparison result. It is therefore possible to simplify the circuit arrangement and reduce the production cost of the apparatus.

The above description is given on a single preferred embodiment of the invention but it will be apparent that many modifications and variations could be effected by one skilled in the art without departing from the spirit or scope of the novel concepts of the invention so that the scope of the invention should be determined by the appended claims only.

We claim as our invention:

1. An apparatus for reproducing a digital signal from a recording medium which has tracks patterned thereon in each of which are recorded a plurality of blocks of data signals, each block of data including a header, a parity of the header and other digital information, the apparatus comprising:
   means for reproducing the recorded signals from the recording medium;
   error detecting means, which monitors the reproduced header parity, for detecting good parity for each block and outputting a corresponding good parity detection signal;
   counting means for counting the good parity detection signal from the error detecting means; and
   comparing means for comparing the error count in the counting means with a predetermined value and outputting a write error decision signal, indicating the corresponding data block has no uncorrectable errors, when the count exceeds the predetermined value, and indicating that the corresponding data block has uncorrectable errors, when the count does not exceed the predetermined value.

2. An apparatus for reproducing a recorded digital signal as claimed in claim 1, wherein the error detecting means includes means for checking the parity of the header in each block and generating a pulse when the parity is correct 3. An apparatus for reproducing a recorded digital signal as claimed in claim 2, wherein the counting means counts the pulses and the comparing means compares the counted value of the pulses with the predetermined value and outputs the write error decision signal, indicating that the data in one of the tracks contains no errors or only correctable errors, when the counted value of the pulses is above the predetermined value.

4. An apparatus for reproducing a recorded digital signal as claimed in claim 1, further comprising:
   envelope detecting means for detecting an amplitude envelope from the reproduced signal, comparing the same with a reference value, and outputting a gate signal when the amplitude of the envelope exceeds the reference value; and
   gate means for gating the output from the error detecting means in response to the gate signal from the envelope detecting means.

5. An apparatus for reproducing a recorded digital signal as claimed in claim 4, wherein the reproduced signal has an amplitude envelope having a main region and subregion, corresponding to different portions of the recorded signal, and wherein the envelope detecting means has different reference values for digital data in the main region and digital data in the sub-region of the reproduced signal.

6. An apparatus for reproducing a recorded digital signal as claimed in claim 1, wherein the signal reproducing means and the error detecting means include a digital audio tape recorder (DAT).

7. An apparatus for reproducing a recorded digital signal as claimed in claim 1, wherein the recording medium is a magnetic tape and the means for reproducing the signal includes a pair of rotary heads for reproducing a signal from the tape and further including means for re-recording digital data on the tape by another pair of rotary heads in response to the write error decision signal indicating an uncorrectable error condition of the recorded digital data.

8. A method of reproducing a digital signal from a recording medium which has tracks patterned thereon in each of which are recorded a plurality of blocks of data signals, each block of data including a header, a parity of the header and other digital information, the method comprising the steps of:

reproducing the recorded signals from the recording medium;

monitoring the reproduced header parity and detecting good parity for each block and outputting a corresponding good parity detection signal;

counting the good parity detection signals; and comparing the error count with a predetermined value and outputting a write error decision signal, indicating the corresponding data block has no uncorrectable errors, when the count exceeds the predetermined value, and indicating that the corresponding data block has uncorrectable errors, when the count does not exceed the predetermined value.

9. A method for reproducing a recorded digital signal as claimed in claim 8, wherein the monitoring and error detecting step includes the step of checking the parity of the header in each block and generating a pulse when the parity is correct.

10. A method for reproducing a recorded digital signal as claimed in claim 9, wherein the counting step counts the pulses and the comparing step compares the counted value of the pulses with the predetermined value and outputs the write error decision signal, indicating that the data in one of the tracks contains no errors or only correctable errors, when the counted value of the pulses is above the predetermined value.

11. A method for reproducing a recorded digital signal as claimed in claim 8, further comprising:

detecting an amplitude envelope from the reproduced signal, comparing the same with a reference value, and outputting a gate signal when the amplitude of the envelope exceeds the reference value; and gating the output from the error detecting step in response to the gate signal from the envelope detecting step.

12. A method for reproducing a recorded digital signal as claimed in claim 11, wherein the reproduced signal has an amplitude envelope having a main region and a subregion, corresponding to different portions of the recorded signal, and wherein the envelope detecting step uses different reference values for digital data in the main region and digital data in the sub-region of the reproduced signal.

13. A method for reproducing a recorded digital signal as claimed in claim 8, wherein the signal reproducing step and the error detecting step are carried out by means of a digital audio tape recorder (DAT).

14. A method for reproducing a recorded digital signal as claimed in claim 8 wherein the recording medium is a magnetic tape and the step of reproducing the signal includes reproducing a signal from the tape by means of a pair of rotary heads and further including the step of re-recording digital data on the tape by another pair of rotary heads in response to the write error decision signal indicating an uncorrectable error condition of the recorded digital data.

* * * * *